Figure 1:
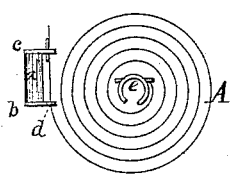

G. NEWTON.
CHRONOMETER-REGULATORS.

No. 194,105. Patented Aug. 14, 1877.

Witnesses:
Jno Barwick Jr.
Thomas Glynn

Inventor:
George Newton

UNITED STATES PATENT OFFICE.

GEORGE NEWTON, OF ST. LOUIS, MISSOURI.

IMPROVEMENT IN CHRONOMETER-REGULATORS.

Specification forming part of Letters Patent No. 194,105, dated August 14, 1877; application filed July 24, 1876.

*To all whom it may concern:*

Be it known that I, GEORGE NEWTON, of St. Louis, in the county of St. Louis and State of Missouri, have invented certain new and useful Improvements in Chronometers, of which the following is a specification:

The object of my invention is to prevent changes in the humidity of the atmosphere from affecting the accuracy of time-keepers; and to this end the invention consists in connecting a material which expands and contracts under slight changes in the humidity of the surrounding air with the hair-spring or pendulum in such manner as to control the time required for its vibration, as hereinafter more fully explained.

Compensating devices of great accuracy and sensitiveness have been hitherto devised to overcome the effect of changes of temperature; but, so far as I am aware, no provision has been made against the effect of the changes in the degree of moisture contained in the atmosphere, although it is known that, as the moisture increases, an increased resistance is offered to the movement of the mechanism, and the beat of the balance or pendulum thereby retarded. This fact is especially noticeable in connection with the chronometers of sea-going vessels, which are subjected to sudden and extreme changes by the humidity of the air, causing often an inaccuracy of time, attended with great danger to the mariner.

My invention is designed, in connection with the ordinary compensations for variable temperatures, to secure a uniform movement of the mechanism and an accurate indication of the time under all circumstances.

In carrying out my invention I make use of wood, leather, cork, or any other substance or composition which will contract and expand as the humidity of the surrounding air changes, and apply the same, either directly or in connection with intermediate devices, in such manner that it will lengthen and shorten the hair-spring or pendulum, and thereby determine the time required for the beat or vibration of the same, the arrangement being such that the expansion of the material shortens the spring or pendulum, and vice versa. As the humidity of the air increases it tends to decrease the speed of the balance or pendulum, but, at the same time, the increased humidity expands my compensating material, and causes it to shorten the spring or pendulum, whereby the latter is given a tendency to increase its speed just sufficient to enable it to continue its regular speed, notwithstanding the increased resistance of the air. When the humidity of the air is diminished it offers less resistance, and the mechanism has a tendency to increase its speed, but the contraction of the material introduced causes an elongation sufficient to compensate for and counteract said tendency, and thus prevents any variation in the speed.

In the accompanying drawings I have represented various embodiments of my invention; but it is obvious that any other suitable arrangement of parts may be adopted, provided the material susceptible to the influence of moisture is arranged to control the length of time of the beats or vibrations of the balance or pendulum, or the speed of such other device as may be used to govern the speed of the mechanism.

Figure 5:
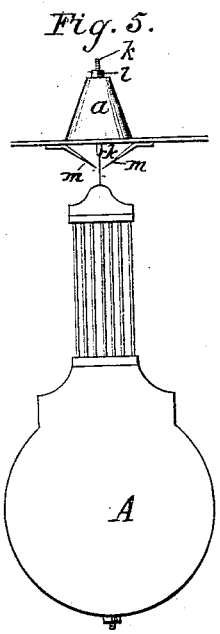

Figures 1, 2, 3, and 4 are face views, showing my arrangement applied to hair-springs in different ways; Fig. 5, a view showing the invention as applied to a pendulum.

In Fig. 1 the hair-spring A is secured at its outer end firmly to the rigid pillar or plate c, to which latter there is also secured the block of wood or other expansive material a, the outer end of which has attached to it a plate, b, through which the spring passes, as shown. As the block a expands and contracts it moves the plate upon the spring, and thereby increases or diminishes the length of the operative portion of the latter, and gives it a tendency to vibrate in a greater or less time.

Figure 2:
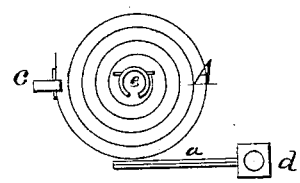

In Fig. 2 the hair-spring has its end secured rigidly to the pillar c, and the expansive material a, composed of two strips of wood glued together, the lower one with its grain running transversely to that of the other, is secured to a fixed support, d. The moisture of the atmosphere, expanding the lower strip, causes it to bend the upper strip upward against the side of the hair-spring, the operating length of which is thereby lessened.

Figure 3:
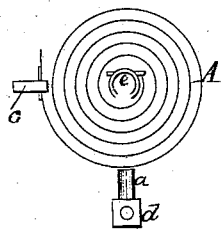

In Fig. 3 the spring is secured at its end rigidly to the fixed pillar c, and the expansive material *a* mounted on a fixed support, *d*, and arranged to expand directly against the side of the spring.

Figure 4:
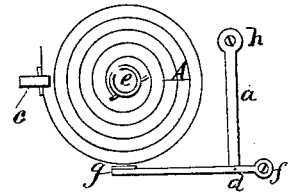

In Fig. 4 the expansive material is fixed at one end, and connected at the other to a pivoted arm, *g*, which it forces against the spring.

In Fig. 5 the pendulum, passing upward between two fixed points or arms, *m*, and through the expansive material *a*, is sustained by a nut resting on said material. The expansion of the material, raising the nut, draws the pendulum upward, shortening its length below the points or arms, and thereby giving it a tendency to quicken its vibration.

Having thus described my invention, what I claim is—

1. In a chronometer, a compensation to overcome the effect of changes in the humidity of the atmosphere, consisting of a material which expands and contracts under the changes of humidity, arranged to lengthen and shorten, automatically, the hair-spring or pendulum, substantially as described and shown.

2. The combination, substantially as described and shown, of a block or strip of wood or equivalent material, *a*, with the hair-spring or pendulum of a time-keeper, for the purpose set forth.

3. The combination of the hair-spring or pendulum of a chronometer and a material which expands under the influence of moisture, the latter arranged to govern, directly or indirectly, the action of the former, substantially as described.

4. In a chronometer, a material which expands and contracts under the changing humidity of the atmosphere applied to counteract the effect of such changes on the speed of of the mechanism, substantially as described, for the purpose of securing a regular unchangeable speed of the mechanism at all times.

GEORGE NEWTON.

Witnesses:
JAS. BARWICK, Jr.,
THOMAS GLYNN.